United States Patent
Chatterjea

[15] 3,677,362
[45] July 18, 1972

[54] HYDROSTATIC TRANSMISSION HYDRAULIC CONTROL AND SINGLE LEVER FOR OPERATING SAME

[72] Inventor: Probir K. Chatterjea, Evanston, Ill.
[73] Assignee: International Harvester Company, Chicago, Ill.
[22] Filed: Sept. 2, 1970
[21] Appl. No.: 69,019

[52] U.S. Cl. .......................... 180/6.48, 137/625.23, 137/596
[51] Int. Cl. ..................................................... B62d 11/04
[58] Field of Search .............. 180/6.48, 6.3; 137/596, 625.23

[56] References Cited

UNITED STATES PATENTS

| | | | |
|---|---|---|---|
| 3,540,220 | 11/1970 | Lauck | 180/6.48 UX |
| 2,766,834 | 10/1956 | Boyer | 180/6.48 |
| 2,182,459 | 12/1939 | Vickers | 137/625.23 |
| 3,306,385 | 2/1967 | Kempson | 180/6.48 |

Primary Examiner—Benjamin Hersh
Assistant Examiner—John A. Pekar
Attorney—Floyd B. Harman

[57] ABSTRACT

Hydraulic control for two hydrostatic transmissions driving a vehicle. Straight-line movement of certain parts of the hydraulic control moves the vehicle in forward and reverse. Angular movement of certain other parts of the hydraulic control turns the vehicle. A single joy stick is directly connected with the first set of parts, and indirectly connected with the second set of parts. One type of movement of the joy stick causes the vehicle to move in forward and reverse, and another type of movement of the joy stick brings about turning of the vehicle.

12 Claims, 8 Drawing Figures

Patented July 18, 1972 3,677,362

Inventor
Probir K. Chatterjea
By John W. Gaines
Atty.

HYDROSTATIC TRANSMISSION HYDRAULIC CONTROL AND SINGLE LEVER FOR OPERATING SAME

This invention relates to a hydraulic control. More specifically, the invention relates to a hydraulic control that is compact and unitary and capable of being operated by a single lever.

It is known to drive a crawler or track-laying tractor in forward and reverse and to steer the same by two separate hydrostatic transmissions acting against two separate drive mechanisms, one at one side of the tractor and the other at the other side. For straight-line movement of the tractor in forward or reverse, the two drive mechanisms are driven at the same speed in the same direction. For turning, one drive mechanism is slowed, stopped, or reversed.

In many installations, it is advisable to employ a hydraulic control for the hydrostatic transmissions in a crawler tractor. It is desirable to operate the hydraulic control from a single member or lever.

According to the present invention, a hydraulic control of the above type has been provided, which is simple, compact, and unitary and can be operated from a single lever.

More particularly, the control is for a tractor vehicle in which two drive mechanism are driven at the same speed in a given direction for straightforward movement of the vehicle, at the same speed in the opposite direction for straight rearward movement of the vehicle, and at speeds in opposite directions or with a speed differential in the same direction to execute power turns in the steering of the vehicle; and in which two hydraulic actuators control the direction of drive of the drive mechanisms by the algebraic signs of the differences of the hydraulic pressures applied to the actuators, and control the speeds of the drive mechanisms by the amounts of said differences. I accordingly provide, in combination with the actuators, a tiltable joy stick and a translatory and rotary bipartite valve operatively related together to afford manual control over an hydraulic pressure differential applied to the actuators; the bipartite valve having a direction part with slidably related pressure differential creating elements, the actuators being connected in the output of the elements and responsive to the signs of the differences of the hydraulic pressures applied thereto by the elements; the bipartite valve further having a steering part with rotatably related pressure differential creating members, the actuators being connected in the output of the members and responsive to the amounts of differences of the hydraulic pressures applied thereto by the members; means supporting the joy stick and bipartite valve in the operative relationship described enabling rightward and leftward tilting of the joy stick to turn the members of the steering part in two directions of rotation; and means supporting the joy stick and bipartite valve in the operative relationship described enabling forward and rearward tilt of the joy stick to slide the elements of the direction part in two directions of translation.

Figures 1, 4, 5:
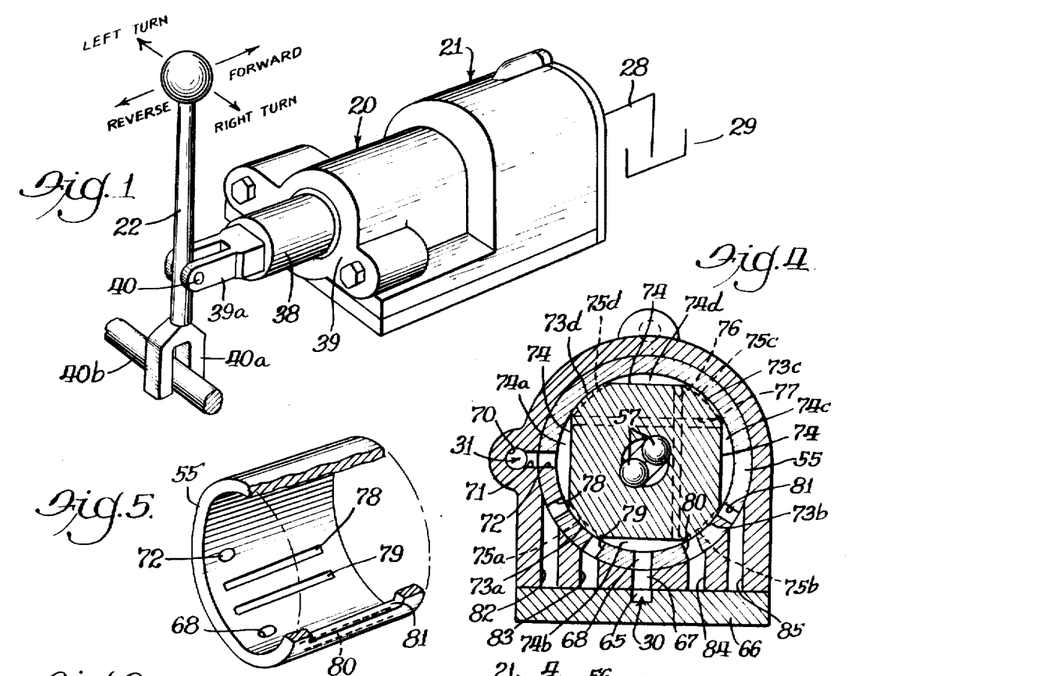
FIG. 1 is a perspective view of a direction unit for a vehicle, a steering unit, and a joy stick governing the unit.
FIG. 4 is a transverse sectional view through the steering unit taken on the line 4—4 of FIG. 2.
FIG. 5 is a perspective view, partially broken away in section, of a sleeve of the steering unit.
Figure 6:
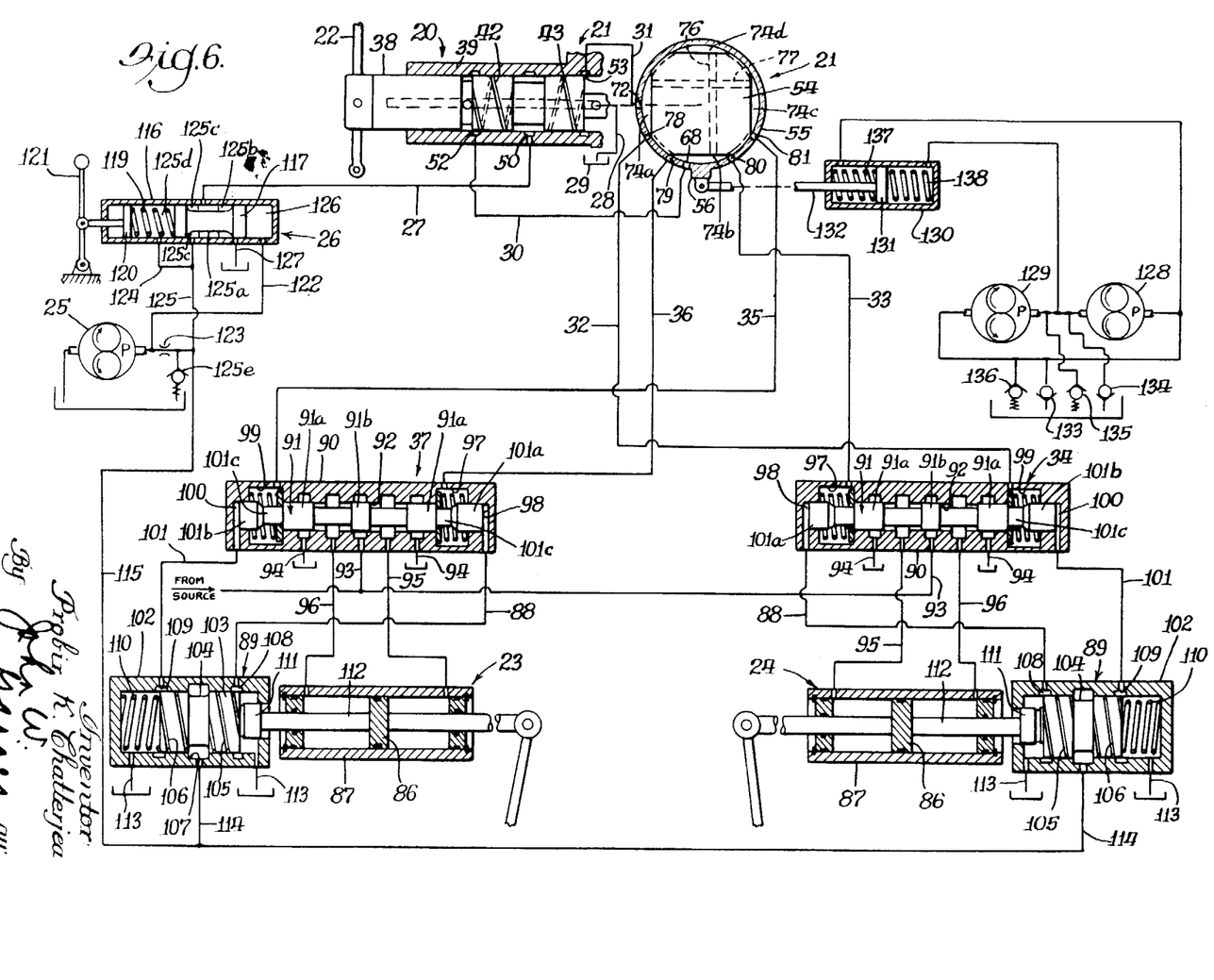
FIG. 6 is a diagrammatic view of the direction and steering units and the hydraulic controls therefor.

As shown in FIGS. 1 and 6, a direction unit 20 and a steering unit 21 are operated by a joy stick to control power units 23 and 24 for positioning two swash plates (not shown) of two swash plate type pumps (not shown) for driving two drive mechanisms (not shown) for a vehicle, for example, the power unit 23 controlling the swash plate of the pump for the left-hand drive mechanism, and the power unit 24, the swash plate of the pump for the right-hand drive mechanism. Specifically, the plate angle of the swash plate is thus controlled to vary pump displacement. Similarly, if a tilting head type hydrostatic pump is employed, the tilt angle of the head is so controlled to vary pump displacement.

As shown in FIG. 6, a control pump 25 driven by the vehicle engine supplies hydraulic fluid through an antistall device 26 and a line 27 to the direction unit 20 and thence through the steering unit and a line 28 to a drain 29. Two hydraulic lines 30 and 31 connect the direction unit 20 with the steering unit 21. Two hydraulic lines 32 and 33 connect the steering unit 21 with opposite ends of a control valve 34 for the power unit 24 for the right-hand drive mechanism. The hydraulic lines 35 and 36 connect the steering unit 21 with opposite ends of a control valve 37 for the power unit 23 for the left-hand drive mechanism of the vehicle.

Forward or reverse movement of the joy stick 22 in the direction of the arrows "FORWARD" and "REVERSE" shown in FIG. 1 causes the direction unit 20 to act through the control valves 34 and 37 against the power units 23 and 24 and thereby actuate the drive mechanisms for forward or reverse movement of the vehicle. Rightward or leftward movement of the joy stick 22 in the direction of the arrows "LEFT TURN" and "RIGHT TURN" acts through the direction unit 20 to cause the steering unit 21 to operate through the control valves 34 and 37 and thereby make the power units 23 and 24 actuate the drive mechanisms for a turn of the vehicle to the left or to the right.

Figure 2:
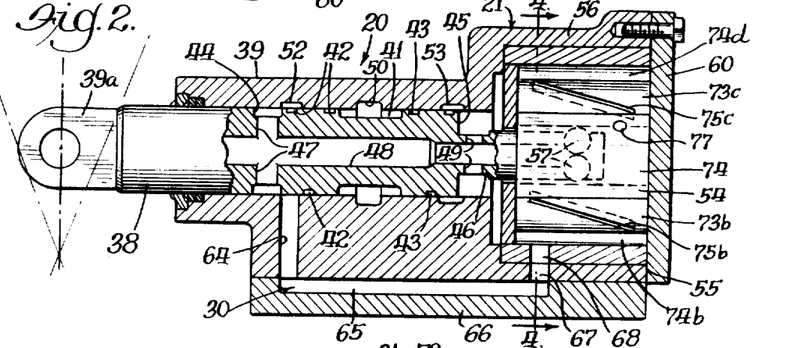
FIG. 2 is a longitudinal sectional view of the direction and steering units.
Figure 3:
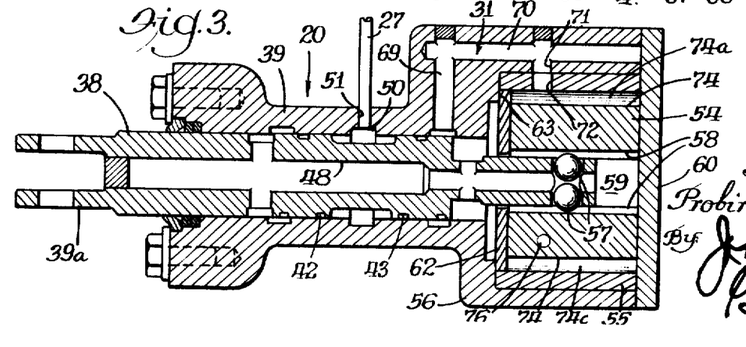
FIG. 3 is a longitudinal horizontal sectional view of the direction and steering units.

As shown in FIGS. 1, 2, and 3, the direction unit 20 comprises a manually adjustable member 38 and an outer member 39 tightly enclosing the same. The inner member 38 is mounted in the outer member 39 for reciprocal movement along the axis of the inner member 38 and for angular movement or rotation about its axis. The inner member 38 protrudes from the outer member 39 and terminates in a bifurcated end 39a, which receives, and is pivotally connected to, an intermediate region of the joy stick 22 by a pin 40. The joy stick 22 has a lower bifurcated end 40a which straddles a fixed rod 40b. In longitudinal movement of the inner member 38, the joy stick 22 pivots about the fixed rod 40b. During angular movement of the inner member 38, the joy stick 22 pivots about the axis of the inner member and its lower end 40a moves along the fixed rod 40b.

The inner member 38 has at an intermediate region located within the outer member 39, a wide external annular groove 41, and two narrow shallow external helical grooves 42 and 43 which are formed in portions of the inner member 38 beyond the ends of the wide groove 41 and extend in opposite directions from the wide groove 41 to a narrow annular external peripheral groove 44 and to a shoulder 45, respectively. The shoulder 45 is located at the juncture of a reduced extension 46 of the inner member 38 with the balance thereof. The narrow groove 44 is displaced from the wide groove 41 axially of the inner member 38 in the opposite direction to the shoulder 45 and is connected by radial openings 47 with a longitudinal axial passage 48 in the inner member 38 which has a closed end adjacent the bifurcated end 39a of the inner member 38 and an open end at the free end of the reduced extension 46 of the inner member 38. Radial passages 49 which are formed in the reduced extension 46 adjacent the shoulder 45 connect the passage 48 with the exterior of the extension 46.

The outer member 39 of the direction unit 20 has a narrow annular internal peripheral groove 50 located so as to be in communication with the wide groove 41 on the inner member 38 in its various longitudinal positions. The supply line 27 is connected to an opening 51 formed in the outer member 39 in communication with the narrow groove 50. The outer member 39 has a narrow annular internal peripheral groove 52 which is spaced from the narrow groove 50 along the axis of the inner member 38 and is adjacent the narrow groove 44 on the inner member 38. The outer member 39 also has a narrow annular internal peripheral groove 53 which is spaced from the groove 50 in the opposite direction to the groove 52, and is adjacent the shoulder 45 on the inner member 38.

The steering unit 21 comprises an inner member or rotor 54, a sleeve 55 embracing the inner member 54, and a casing section 56, in which the sleeve 55 is attached, and which is integral with the outer member 39 of the direction unit 20. The inner member or rotor 54 is keyed so as to rotate with the inner member 48 of the direction unit 20 by means of two balls 57 which engage axial grooves 58 formed in a central axial opening 59 in the rotor 54. The balls 57 are lodged in openings formed in the reduced extension 46 of the inner member 38. The inner member or rotor 54 is held against axial movement in the sleeve 55 by means of a cover or end plate 60 secured to the casing section 56 and by an annular disc 62 which rests against an annular shoulder 63 formed in the casing section 56 and has a central opening large enough to pass the reduced extension 46 on the inner member 38 of the direction unit 20 but not large enough to pass the balls 57 lodged in the reduced extension 46. The drain line 28 is connected to an opening in the end plate 60.

As previously described with reference to FIG. 6, lines 30 and 31 connect the direction unit 20 with the steering unit 21. At the direction unit 20, the lines 30 and 31 are connected with the annular grooves 52 and 53, which constitute take-off openings. As shown in FIGS. 2 and 4, the line 30, which is connected to the annular groove 52, is actually composed of a passage 64 extending in the outer member 39 of the direction unit 20 from the annular groove 52, a passage 65 which extends from the passage 64 and is formed by a groove in a bottom plate 66 attached to the outer member 39 and the adjacent surface thereof, a short passage 67 in the casing section 56 of the steering unit 21 in communication with the passage 65, and an opening 68 in the sleeve 55 in registry with the passage 67. As shown in FIGS. 3 and 4, the line 31 which is connected with the annular groove or take-off opening 53, is actually composed of a passage 69 extending from the groove 53 in the juncture of the casing section 56 of the steering unit 21 with the outer member 39 of the direction unit 20, a passage 70 in the casing section 56 connected with the passage 69, an opening 71 in the passage 70, and an opening 72 formed in the sleeve 55 in registry with the opening 71.

As shown in FIGS. 2 and 4, the outer surface of the inner member or rotor 54 has four arcuate segments 73a, 73b, 73c, and 73d, which engage the interior of the sleeve 55 and are spaced from one another by four other surface segments 74 which are planar and are spaced from the interior of the sleeve 55 so as to form therewith four chambers 74a, 74b, 74c, and 74d. The inner member or rotor 54 and the sleeve 55 have an appreciable length or axial dimension. As shown in FIGS. 2, 4, 7, and 8, each of the arcuate segments 73a, 73b, 73c, and 73d is provided with a small shallow groove 75a, 75b, 75c, or 75d which extends for a substantial portion of the length of the inner member 54 between the sides of the arcuate segment 73. Each groove 75a, 75b, 75c, or 75d is very generally parallel to the axis of the inner member 38, although extending somewhat therearound, because its ends are at the sides of the arcuate segment 73. Since the inner member 54 has appreciable length, as previously stated, and each groove 75a, 75b, 75c, or 75d extends for a substantial portion of the length of the inner member 54, also as previously stated, each groove has an appreciable length. A cross passage 76 in the inner member 54 extends between two opposed surface segments 74 so as to interconnect chambers 74b and 74d. A cross passage 77, which is separate from and unconnected with the cross passage 76, extends through the inner member 54 between the two remaining surface segments 74 so as to interconnect chambers 74a and 74c.

As shown in FIGS. 4, 5, 7, and 8, the sleeves 55 has four longitudinal slots 78, 79, 80, and 81 which are of appreciable length, extend parallel to the axis of the inner member 38 of the direction unit 28, and are generally coextensive with grooves 75a and 75b in surface segments 73a and 73b of inner member 54. Thus; slots 78 and 79 are capable of overlapping or intersecting the groove 75a; and slots 80 and 81, the groove 75b.

As shown in FIGS. 4 and 6, slots 78, 79, 80, and 81 constitute take-off openings of the steering unit 21 and are connected respectively with lines 32, 36, 35, and 33, portions of which are formed by passages 82, 83, 84, and 85, respectively, in the casing section 56 of the steering unit 21.

IN NEUTRAL, VERTICALLY DISPOSED

Again, with reference to the direction unit 20, and as shown in FIGS. 1, 2, 3, and 6, the hydraulic fluid in the wide groove 41 of the inner member 38 and in the ends of the helical grooves 42 and 43 thereon adjacent the wide groove 41 is at source pressure or pump pressure as produced by the engine-driven pump 25. When the joy stick 22 is positioned in neutral as shown, midway between forward and reverse, drain pressure exists in the grooves 52 and 53 in the outer member 39 of the direction unit 20, because in this position the grooves 52 and 53 are at the groove 44 and the shoulder 45, which are at drain pressure, because of being connected with the drain line 28 through the openings 47 and 49 and passage 48 in inner member 38 and the end plate 60.

Since drain pressure exists in grooves 52 and 53, and lines 30 and 31, respectively, connect these grooves with chambers 74a and 74b in the steering unit 21, drain pressure exists in chambers 74a and 74b. Since chambers 74a and 74b are connected with chambers 74c and 74d, respectively, by passages 76 and 77 in the inner member 54 of the steering unit 21, drain pressure also exists in the chambers 74c and 74d. Thus, lines 32, 36, 35, and 33 are all at the same pressure, namely, drain pressure. Since lines 32 and 33 are at the same pressure, valve 34 is closed, and power unit 23 is kept from starting the drive of the right-hand drive mechanism of the vehicle. Similarly, since drain pressure is in lines 35 and 36, valve 37 is closed, and the power unit 23 is prevented from staring the drive of the left-hand drive mechanism.

STRAIGHT AHEAD OPERATION

Assume now the vehicle is to be driven forwardly in a straight line. The joy stick 22 while extending straight up midway between "RIGHT TURN" and "LEFT TURN," is moved to the right as viewed in FIG. 1 in the direction of the arrow "-FORWARD." The inner member 38 of the driving unit 20 is moved to the right as viewed in FIGS. 2, 3, and 6 of the position of these figures, with the result that the shoulder 45 on the inner member 38 is moved somewhat to the right of the groove 53 in the inner member 38, which groove in effect moves along helical groove 43.

Since the groove 53 is now at some intermediate point in the length of the helical groove 43, the pressure in groove 53, line 31, and chambers 74a and 74c is at some increased level between drain pressure and source pressure. At the same time, the groove 52 in the outer member 39 continues to overlap groove 44 on the inner member 38, in spite of relative shifting of these grooves, and so drain pressure continues to exist in groove 52, line 30, and chambers 74b and 74d. Since the joy stick 22 is positioned between RIGHT TURN and LEFT TURN, as aforesaid, the inner member or rotor 54 of the steering unit 21 is positioned, by virtue of its connection with the joy stick 22 through the inner member 38 of the direction unit 20 and the balls 57 in the extension 46 thereof, in the position of FIG. 6, in which groove 78 is overlapped by chamber 74a, grooves 79 and 80 by chamber 74b, and groove 81 by chamber 74c. Since an intermediate pressure exists in chambers 74a and 74c, it also exists in grooves 78 and 81 and lines 32 and 35. Since drain pressure exists in chamber 74b, it also exists in grooves 79 and 80 and lines 36 and 33.

Since line 33 continues at drain pressure, and line 32 is now at the higher intermediate pressure, the valve 34 is opened in a way to be described later and causes piston 86 of the power unit 24 to move in cylinder 87 thereof to the left as viewed in FIG. 6 for producing a forward drive of the right-hand drive mechanism of the vehicle. Similarly, since line 35 is at the increased intermediate pressure, and line 36 continues at the drain pressure, valve 37 is opened in such a way as to move piston 86 of power unit 23 in cylinder 87 thereof to the right as viewed in FIG. 6, causing the forward drive of the left-hand drive mechanism of the vehicle.

When the left-hand and right-hand drives of the vehicle reach the speed corresponding to the displacement of the joy stick 22 forward from the neutral position, movement of the pistons 86 in the cylinders 87 of the power units 23 and 24 is stopped by closing of the valves 34 and 37 due to increase in pressures in lines 88 to those in lines 32 and 35, which increase in pressure is caused by adjustment of feed-back devices 89 by the shifting of pistons 86 of power units 23 and 24. Details of the power units 23 and 24, valves 34 and 37, and the feed-back devices 89 will be provided later in the specification.

Figure 7:
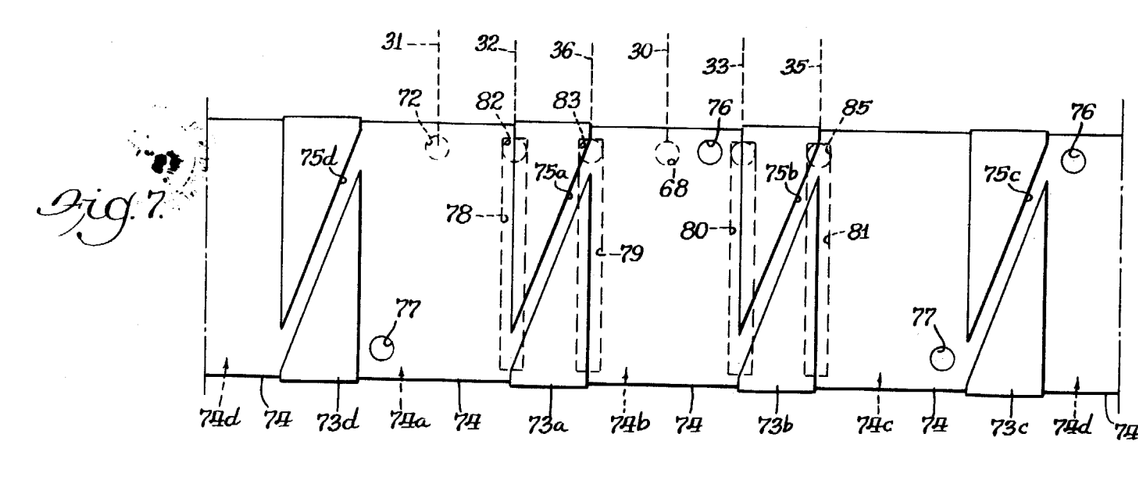
FIG. 7 is a schematic developed view of portions of the steering unit.

Let us again consider straight-ahead forward drive of the vehicle, this time with reference to the developed view of FIG. 7. This view is obtained by cutting the surface of the inner member or rotor 54 longitudinally at the top flat segment 74 at the chamber 74d, spreading said surface out flat, and superimposing in phantom the slots 78, 79, 80, and 81 of the sleeve 55. The lines 30, 31, 32, 33, 35, and 36, and the chambers 74a, 74b, 74c, and 74d.

Line 31 is at an increased pressure intermediate drain pressure and source pressure, and the line 30 continues at drain pressure, because of displacement of the inner member 38 of the direction unit 20 to the right as viewed in FIGS. 2, 3, and 6 from the neutral position shown in these figures. The increased pressure in line 31 is also present in line 32, because of the connection of these lines through the chamber 74a, slot 78, and passage 82. The groove 75a does not reduce the pressure in line 32 below that in line 31, because, as shown in FIG. 7, the chamber 74a is directly connected with the slot 78 and opening 82 and is connected with the groove 75a only at the end thereof directly adjacent the chamber 74a. The increased pressure in line 31 also exists in line 35, because these lines are connected with one another through the chamber 74a, cross passage 77, chamber 74c, slot 81, and opening 85. The groove 75b has no effect upon the pressure in the line 35, because the slot 81 and opening 85 are directly connected with the chamber 74c, while being connected with the groove 75b only at the end thereof connected with the chamber 74c. The drain pressure, continuing in line 30, is also present in lines 33 and 36, because lines 33 and 36 are connected with the line 30 in a direct way through the chamber 74b, slots 79 and 80, and openings 83 and 84, the connection of the lines 33 and 36 with the grooves 75a and 75b being only at the ends thereof opening into the chamber 74b. Thus, the lines 32 and 35 are at the same increased pressure intermediate drain pressure and source pressure, namely, drain pressure, with the result that the left-hand and right-hand drive mechanisms of the vehicle are driven in a forward direction at the same speed and produce straight-ahead forward movement of the vehicle.

RIGHT TURN

Figure 8:
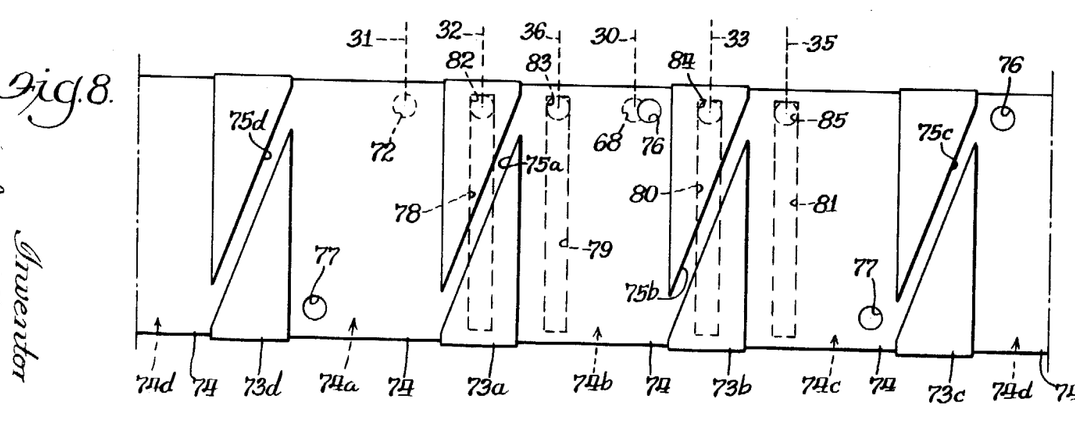
FIG. 8 is a view similar to FIG. 7, but with the parts in a different relative position.

If now the vehicle is to be turned to the right, the joy stick 22 is manipulated so as to move the inner member 38 of the direction unit 20 so as to produce clockwise movement of the inner member or rotor 54 of the steering unit 21 as viewed in FIGS. 4 and 6. Clockwise movement of the inner member 54 results in relative shifting of the slots 78, 79, 80, and 81 and openings 82, 83, 84, and 85 to the right as viewed in FIGS. 7 and 8 from the position of FIG. 7 to that of FIG. 8. Thus, as seen in FIG. 8, the slots 78 and 80 are moved out of overlapping relationship with the chambers 74a and 74b, respectively, and thus out of direct connection therewith. Now the slots 78 and 80 are connected with the grooves 75a and 75b, respectively, at intermediate regions of their lengths. It must be understood that there is a drop in pressure along the lengths of the grooves 75a and 75b, because these grooves are connected at one end to the chambers 74a and 74c at the intermediate pressure and at the other end to chamber 74b at the drain pressure, which is, of course, the lower pressure. Thus, there are a decrease in the pressure in slot 78 and the line 32 connected therewith from the intermediate pressure in line 31 and chamber 74a toward drain pressure, and an increase in the pressure in slot 80 and the line 33 connected therewith from drain pressure toward the intermediate pressure in chamber 74a and line 31.

Since the lines 32 and 33 are connected with the valve 34, the pressure decrease in line 32 and pressure increase in line 33 act through the valve 34 and power unit 24 to slow the speed of the right-hand drive mechanism of the vehicle, stop it, or reverse it, depending on whether the new pressure in line 32 continues greater than, is equal to, or is lower than, the new pressure in line 33. Clockwise movement of the inner member or rotor 54 of the steering unit 21 has no effect on the pressures in the lines 35 and 36 and thus enables the left-hand drive mechanism of the vehicle to continue in the same forward speed, because clockwise movement of the inner member 54 does not disturb the direct connection of the slots 79 and 81 with the chambers 74b and 74c, respectively, the slots 79 and 81 merely moving transversely of the chambers 74b and 74c away from the sides thereof, as will be evident from the comparison of FIG. 7 with FIG. 8. Since the left-hand drive mechanism of the vehicle continues at the same forward speed, and the right-hand drive mechanism is slowed, stopped, or reversed, the vehicle is turned to the right.

LEFT TURN

When the vehicle is to be turned to the left, the joy stick 22 is manipulated so as to move the inner member 38 of the direction unit 20 so as to cause counterclockwise movement of the inner member or rotor 54 of the steering unit 21 as viewed in FIGS. 4 and 6. This results in relative shifting of the slots 78, 79, 80, and 81 to the left of the position indicated in FIG. 7. This new position of the slots is not shown, but can be understood by picturing the reverse of the rightward shift illustrated in FIG. 8. With leftward movement of the slots, the lines 32 and 33 continue at the intermediate pressure of line 31 and at the drain pressure of line 30, respectively, because the direct connection of the slots 78 and 80 with the chambers 74a and 74b, respectively, continues, since the slots 78 and 80 are merely moved out of overlapping relation with the sides of the chambers 74a and 74b toward the middle regions thereof. Since there is no change in pressure in lines 32 and 33, the right-hand drive mechanism of the vehicle continues at the same forward speed. Slots 79 and 81, on the other hand, are moved away from the chambers 74b and 74c and become connected with intermediate regions of the grooves 74a and 74b. Thus the pressure in slot 79 and line 36 connected therewith is increased from drain pressure toward the intermediate pressure existing in chambers 74a and 74c and line 31 and the pressure in slot 81 and line 35 connected therewith is reduced from the intermediate pressure in line 31 toward the drain pressure. Thus depending on whether pressure in line 35, though reduced, stays greater than that in line 36, becomes equal to it, or decreases below it, the left-hand drive mechanism of the vehicle is slowed, stopped, or reversed. Consequently, the vehicle is turned to the left.

Only the two grooves 74a and 74b and the three chambers 74a, 74b, 74c control the pressures in the slots 78, 79, 80, and 81 and thus the lines 32, 36, 33, and 35 connected therewith, respectively. The remaining two grooves 75c and 75d and the chamber 74d are not directly involved in control of pressures in the aforesaid slots and lines; instead, they provide a balance in the relationship of the inner member or rotor 54 with the sleeve 55 surrounding it. Thus, the chamber 74d has the same pressure as the chamber 74b, because of the cross passage 76 connecting these chambers. The chamber 74c has the same pressure as the chamber 74a, because of the connecting cross passage 77. The arcuate segments 73a, 73b, 73c, and 73d on the inner member 54 have the same widths and the grooves 75a, 75b, 75c, and 75d have the same lengths, widths, and depths. Arcuate segments 73a, 73b, 73c, and 73d are equally spaced from one another about the inner member 54. Thus, the inner member 54a is centrally mounted in the sleeve 55 and has the same clearance at all arcuate segments.

A significant feature of the present invention is that each of grooves 75a, 75b, 75c, and 75d is of appreciable length so that the reduced orifices formed by these grooves and the adjacent inner surface portions of the sleeve 55 are also of appreciable length. Moreover, these grooves, although extending somewhat about the axis of rotation of the inner member 54, extend rather generally parallel to the axis. Thus, reliable proportional control of pressure gradient in the orifices formed by the grooves 75a, 75b, 75c, and 75d is achieved with a limited angle of incremental rotation of the inner member 54. The grooves are of appreciable length, although being four in number and formed on arcuate segments 73a, 73b, 73c, and 73d of limited peripheral extent, because the inner member 54 on which the grooves are formed has an appreciable length or axial dimension. It is also of significance that the grooves 75a, 75b, 75c, and 75d are connected with the lines 32, 36, 35, and 33 through the slots 78, 79, 80, and 81, which are also of appreciable length and extend parallel to the axis of the inner member 54. Thus, as the inner member 54 is turned clockwise or counterclockwise for steering of the vehicle, the grooves 75a and 75b are always connected with the slots 78, 79, 80, and 81, and the regions of the grooves 75a and 75b connected with the slots shifts along the grooves as the inner member 54 is turned. This is evident from a comparison of FIGS. 7 and 8.

Because the grooves 75a, 75b, 75c, and 75d, are long and slightly helical and cooperate with long longitudinal slots 78, 79, 80, and 81, and the grooves and slots are on a long inner member 54 and a long sleeve 55, the grooves and slots can function by relative rotation of the inner member and the sleeve. Since steering unit 21 functions by relative rotation, because of its grooves 75a and 75b and slots 78–81, and since the direction unit 20 functions by relative longitudinal movement of its members 38 and 39, the joy stick 22 operates by one motion, namely, that of swinging about fixed rod 40b, to adjust the driving unit 20, and by another motion, namely, that of pivoting about the axis of inner member 38, to adjust the steering unit 21. Since the rotor 54 and sleeve of steering unit 21 are held against relative longitudinal movement, and relative rotation of the members 38 and 39 of the driving unit 20 has no effect on the driving unit, the driving unit is directly connected with the joy stick 22, and the steering unit is directly connected with the driving unit and thus with the joy stick. Thus, a unitariness of construction is achieved.

As shown in FIG. 6, each of the power units 34 and 37 comprises a housing 90 and a valve spool 91 which is movably mounted therein and is provided with outer lands 91a and a central land 91b. The housing 90 has a central bore 92 at which five annular grooves are formed. The middle groove is connected to a supply line 93 leading from a source of hydraulic pressure fluid. The end grooves are connected to drain lines 94. The two remaining grooves are connected to delivery lines 95 and 96 leading to opposite ends of the cylinder 87 of the power unit 23 or 24. Beyond one end of the housing bore 92 a chamber 97 of relatively large diameter is located to which the line 33 or 36 for the valve 34 or 37 is connected. The housing 90 has beyond the chamber 97, a chamber 98 of relatively small diameter to which the line 88 leading to the feed-back device 89 is connected. Beyond the other end of the central bore 92, The housing 90 has a chamber 99 of relatively large diameter to which the line 32 or 35 for the valve 34 or 37 is connected. Beyond the chamber 99, the housing 90 has a chamber 100 of relatively small diameter to which a line 101 is connected leading to the feed-back device 89. Pistons 101a and 101b are mounted in the chambers 98 and 100, respectively, and project into engagement with reduced end portions 101c of the valve spool 91.

FEED BACK

Each of the feed-back devices 89 comprises an outer member 102 and an inner member 103 movably mounted therein. The inner member 103 has an annular peripheral groove 104 and two narrow shallow helical grooves 105 and 106 extending from the ends of the groove 104 to the ends of the inner member 103. The outer member 102 has an internal annular peripheral groove 107. The grooves 104 and 107 are wide enough to remain in communication with one another in various longitudinal positions of the inner member 103. The outer member 102 has two internal annular peripheral grooves 108 and 109, to which the lines 88 and 101, respectively, are connected, and which are positioned beyond, at, or within the ends of the inner member 103, depending on its longitudinal position. A coil spring 110 acts between a closed end of the outer member 102 and the adjacent end of the inner member 103 to maintain contact between the other end thereof and an enlarged end 111 secured to one end of a rod 112 which is attached to and extends through the piston 86. The ends of the outer member 102 are connected to drain lines 113. The groove 107 in the outer member 102 is connected by a supply line 114 connected to a supply line 115 leading to the engine-driven pump 25. The pressure in the lines 88 and 101 and in the chambers 98 and 100 of the control valve 34 or 37 connected thereto are dependent on the position of the inner member 103 of the feed-back device with respect to the outer member 102. The grooves 104 and 107, being connected to the pump 25 by the lines 114 and 115, are at source pressure or pump pressure. The inner ends of the helical grooves 105 and 106 adjacent the groove 104 are likewise at source or pump pressure. The chambers or spaces in the outer member 102 of the feed-back device 89 beyond the ends of the inner member 103 are at drain pressure, as are the ends of the helical grooves 105 and 106 at the ends of the inner member. Hydraulic fluid flows from the inner ends of the helical grooves 105 and 106 to the outer ends thereof and drops in pressure along the grooves, because they are narrow and shallow and offer considerable resistance to flow of the hydraulic fluid.

As previously stated, positioning of the inner member 38 of the direction unit 20 for forward drive of the vehicle involves moving such inner member to the right as viewed in FIG. 6, and this action results in increase in pressure in line 31 and thus in lines 32 and 35. At the same time, the pressure in line 30 and lines 33 and 36 remain at drain pressure. Because lines 32 and 35 increase in pressure and lines 33 and 36 stay at the same pressure, chambers 99 of valves 34 and 37 increase in pressure while chambers 97 stay at their same pressure. The result is leftward movement of valve spool 91 of valve 34 and rightward movement of valve spool 91 of valve 37, connection of line 96 with supply line 93, connection of line 95 with drain line 94, rightward movement of piston 86 of power unit 23 and leftward movement of piston 86 of power unit 24. Consequently, inner member 103 of feed-back device 89 associated with power unit 23 moves to the right and the inner member 103 of the outer feed-back device 89 moves to the left. The result is that the pressure in the line 88 at each feedback device 89 is increased, because the grooves 108 in the outer members 102 of the feed-back devices 89 connected with lines 88 move, relatively speaking, within the ends of the inner members 103 and thus are subjected to some increased pressure existing at some intermediate point in the helical grooves 105, which pressure is higher than the drain pressure beyond the ends of the inner members 103.

The pressure increase in lines 88 and the chambers 98 in the outer valve members 90 connected to these lines causes pistons 101a, mounted in the chambers 98 and engaging the end portions 101c of the inner members 91, to return the inner members 91 to the position of FIG. 6, in which lands 91a and 91b on the inner members 91 block the supply line 93, the drain lines 94, and the lines 95 and 96 leading to the cylinders 87 of the power units 23 and 24. Since lines 95 and 96 are blocked, the positions of the pistons 86 in the cylinders 87 are fixed, and as a result the speeds of the drive mechanisms of the vehicle are set.

The antistall device 26 mentioned at the beginning of the description forms no per se part of the present invention. But for sake of completeness, it is described as follows. This device comprises a cylinder 116, a piston 117, a coil spring 119, a piston 120 controllable by a throttle 121, a line 122 leading to a closed end of a cylinder 116 from a region at the delivery side of the pump 25 ahead of a restriction 123, and a line 124 connected between a delivery line 125 of the pump 25 and a region of the cylinder 116 between the pistons 117 and 120. The piston 117 has a reduced middle region 125a, two diametrally opposed longitudinal grooves 125b extending from one end of middle region 125a with a depth progressively decreasing to zero, and two diametrally opposed longitudinal grooves 125c extending from the other end of middle region 125a with a depth progressively decreasing to zero.

The throttle 121 and the piston 120 controlled thereby may assume various positions corresponding to various speeds of the vehicle. The farther the throttle 121 and piston 120 are moved to the right, the farther the piston 117 tends to be moved to the right by the piston 120, which acts against piston 117 through the spring 119 and the pressure in a chamber 125d formed in the cylinder 116 between pistons 117 and 120. The pressure in chamber 125d is constant, being limited to some value such as 200 p.s.i., because of a relief valve 125e connected to the delivery side of the pump 25 beyond the restriction 123. The farther the throttle 121 and piston 120 are moved to the right, the greater the engine speed, the greater the speed of the pump 125, the greater the pressure delivered by the pump 25 ahead of the restriction 123, and the greater the pressure in the line 122 and a chamber 126 which is connected to the line 122 and is formed between the piston 117 and the adjacent closed end of the cylinder 116. Thus, with greater engine speed and the more the tendency for the piston 120 to move the piston 117 to the right, the more the tendency for the piston to move to the left because of the greater difference between the greater pressure in chamber and the constant pressure in the chamber formed between pistons 117 and 120. So for a given engine speed, whether high or low, and normal operation of the engine, the piston 117 occupies its normal position shown in FIG. 6 in which position a drain line 127 leading from the cylinder 116 is blocked. In this condition, hydraulic pressure fluid flows from the line 125 through the space between the reduced portion 125a of the piston 117 and the cylinder 116 and through line 27 to the direction unit 20, without escape of pressure fluid through drain line 127 and without loss of pressure from line 125 to line 27.

When, however, stalling occurs or tends to occur, the engine and the pump 25 slow down, without a change in the position of the throttle 121, and the pressure delivered by the pump 25 ahead of the restriction 123 to the line 122 and the chamber 126, is reduced. Thus, the pressure difference between chamber 126 and chamber 125d, whose pressure is held constant by relief valve 125a, is reduced. Because of this reduced pressure difference, the action of spring 120, and the maintenance of position of piston 120 by throttle 121, the piston 117 moves to the right, uncovering drain line 127 to the grooves 125b on piston 117 and relatively shifting the pump-delivery line 125 from the reduced middle region 125a of the piston 117 to he grooves 125c thereon. Now as the hydraulic fluid flows between the piston 117 and cylinder 116 from delivery line 125 to drain line 127, its pressure is reduced from the constant delivery pressure to drain pressure, because of the resistance offered by the grooves 125b and 125c of the piston 117.

Also, the pressure in line 27 is reduced from delivery pressure to an intermediate pressure greater than drain pressure, because of the resistance offered by the grooves 125c alone. The reduction in pressure in line 27 is dependent on the ratio of the flow resistance in grooves 125c to the combined flow resistance in grooves 125c and 125b. Because grooves 125b increase in depth from right to left as viewed in FIG. 6, and grooves 125c decrease in depth from right to left, the more the piston 117 moves to the right in uncovering drain line 127, the greater the resistance offered by groove 125c and the less the resistance offered by grooves 125b, and the more the pressure in line 27 is reduced toward drain pressure. The more the engine slows in stalling, the lower the pressure in chamber 126, the farther the piston 117 is moved to the right, the greater the pressure reduction in line 27.

Reducing pressure in line 27 lowers the intermediate pressure in line 31 or 30, line 33 or 32, and line 35 or 36, depending on whether the joy stick 22 is positioned for forward or reverse, and the valves 34 and 37 move the pistons 86 for a slower speed of the drive mechanisms of the vehicle. The more the pressure is reduced in line 27, the more the pistons 86 are moved, and the slower the drive mechanisms are driven.

When the engine again operates normally, its speed increases to that for which the throttle 121 is set, and the control pump 25 goes faster. Pressure in line 122 and chamber 126 increases, and piston 117 is moved to the left so as again to block the drain line 27. This action restores the pressure in line 27, and the resultant action on the lines 30, 31, 32, 36, 35, and 33 makes the valves 34 and 37 reposition the pistons 86 of the power units 23 and 24 for restoration of the speed of the vehicle's drive mechanisms.

It sometimes happens that the drive mechanisms do not drive the vehicle at the same speed, even though the pumps for such drive mechanisms are presumably set through their swash plates or tilting heads for the same speed in both drive mechanisms. Compensation for such difference in speeds is provided by two gear pumps 128 and 129 connected to the right-hand and left-hand drive mechanisms, respectively, of the vehicle, a cylinder 130 connected to the pumps, a piston 131 mounted in the cylinder, and a rod 132 connecting the piston and the casing casing section 56 of the steering unit 21. The gear pumps 128 and 129 are controlled by intake valves 133 and 134 and pressure relief valves 135 and 136 operating, for example, at about 50 lbs. Chambers 137 and 138 formed in the cylinder 130 at opposite sides of the piston 131 are subjected to pressure supplied by gear pumps 128 and 129, respectively. When the drive mechanisms of the two sides of the vehicle are operated at the same speed, the pumps 128 and 129 at the same speed, chambers 137 and 138 in the cylinder 130 have the same pressure, and the piston 131 is thereby centrally positioned in the cylinder 130 so as to act through the rod 132 to make the casing section 56 of the steering unit 21 occupy a neutral or central position. When the right-hand drive mechanism of the vehicle has a higher speed than the left-hand drive mechanism, the greater speed of pump 128 makes the pressure in chamber 137 greater than that in chamber 138. Thus, the piston 131 is moved to the right, and the casing section and sleeve 55 of the steering unit 21 is shifted counterclockwise as viewed in FIG. 6. The result is that those parts are repositioned somewhat as indicated by a comparison of FIG. 8 with FIG. 7, but probably not to the extent represented by the difference between these figures. The pressure in lines 32 and 33 is modified to bring about a lower speed of the right-hand drive mechanism. At the same time the counterclockwise shifting of the casing section 56 and sleeve 55 are without effect upon the lines 35 and 36 controlling the left-hand drive mechanisms, and this mechanism continues at its same speed.

Stops (not shown) are provided to limit to a small amount the movement of the piston 131 in the cylinder 130 and the angular movement of the casing section 56 and sleeve 55 with respect to the rotor 54 of the steering unit 21. Thus, when the vehicle is to be turned, rather than driven in a straight direction, the angular movement of the inner member or rotor 54 of the steering unit 21 with respect to the sleeve 55 required for turning of the vehicle easily overrides the small movement of the sleeve 55 and casing section 56 permitted by the stops.

What is claimed is:

1. In a vehicle in which two drive mechanisms are driven at the same speed in a given direction for straight forward movement of the vehicle, at the same speed in the opposite direction for straight rearward movement of the vehicle, and in opposite directions or at different speeds in the same direction for steering of the vehicle; two hydraulic actuators control the direction of drive of the drive mechanisms by the algebraic signs of the differences of the hydraulic pressures applied to the actuators, and the speeds of the drive mechanisms by the amounts of said differences; and a joy stick is moved forwardly and rearwardly for forward and rearward movement of the vehicle and to the right and to the left for turning of the vehicle; the combination with the actuators and the joy stick, of a. a direction unit having two restricted orifices of appreciable length, each orifice having one end connected to a source of fluid under pressure and the other end connected to drain, said unit further having two take-off openings, one communicating with one orifice, the other with the other orifice, said unit comprising cooperating relatively movable parts forming the two orifices between them, relative movement of the parts in one direction shifting one take-off opening along the associated orifice in a direction toward the end connected to drain and the other take-off opening along the associated orifice in a direction toward the end connected to the source of pressure fluid, and relative movement of the parts in the opposite direction reversing the shift of the take-off openings with respect to the source of pressure fluid and drain;

b. means connecting the joy stick with the direction unit to enable forward and rearward movement of the joy stick to produce relative movement of one of the parts of said unit in said one direction and said other direction;

c. a steering unit comprising two cooperating relatively movable parts, two restricted orifices of appreciable length being formed between facing regions of the parts, the steering unit having two supply openings, one being connected with one take-off opening of the direction unit, the other connected with the other take-off opening of the direction unit, the steering unit further having first, second, third, and fourth take-off openings all formed in the same part of the steering unit, the first and third take-off openings being connected with one hydraulic actuator, the second and fourth take-off openings being connected with the other hydraulic actuator, a central position of one steering-unit part with respect to the other causing the first and fourth take-off openings and the second and third take-off openings to be connected with the said one supply opening and the said other supply opening, respectively, independently of the orifices in the steering unit, the first and second take-off openings to be connected with one another by way of the entire length of the one orifice of the steering unit, and the third and fourth take-off openings to be connected with one another by way of the entire length of the other orifice of the steering unit, displacement of said one steering-unit part from its central position in one direction with respect to said other steering unit part causing the first take-off opening and the third take-off opening to remain connected with the said one supply opening and said other supply opening, respectively, independently of the orifices of the steering unit, and the fourth take-off opening and the second take-off opening to be connected with the said one supply opening and the said other supply opening, respectively, by way of portions of the lengths of the said other orifice and the said one orifice, respectively, of the steering unit, displacement of said one steering-unit part from its central position in the opposite direction with respect to said other steering-unit part causing the fourth take-off opening and the second take-off opening to remain connected with the said one supply opening and said other supply opening, respectively, independently of the orifices of the steering unit, and the first take-off opening and the third take-off opening to be connected with the said one supply opening and the said other supply opening, respectively, by way of portions of the lengths of the said one orifice and the said other orifice, respectively, of the steering unit; and d. means connecting the joy stick with the steering unit to enable rightward and leftward movement of the joy stick to produce relative angular movement of the parts of the steering unit in two directions.

2. The combination as specified in claim 1, one part of the direction unit being connected to the joy stick and being keyed to the said one steering-unit part.

3. The combination as specified in claim 2, the steering unit being formed of inner and outer parts having facing inner and outer surfaces and being angularly movable with respect to one another about an axis of rotation, the restricted orifices of the steering unit being formed between the facing surface of one of said inner and outer parts and two relatively long grooves formed in the facing surface of the other of said parts and extending for an appreciable distance generally parallel to the axis of rotation and to a slight extent about the axis of rotation, the take-off openings of the steering unit being formed in the facing surface of the said one part and extending parallel to said axis of rotation for an appreciable distance.

4. The combination as specified in claim 3, the grooves forming part of the restricted orifices of the steering unit being on the outer surface of the inner part, the take-off openings being formed in the inner surface of the outer part.

5. In a vehicle in which two drive mechanisms are driven at the same speed in a given direction for straight forward movement of the vehicle, at the same speed in the opposite direction for straight rearward movement of the vehicle, and in opposite directions or at different speeds in the same direction for steering of the vehicle; two piston-and-cylinder assemblies control the two drive mechanisms; the piston-and-cylinder assemblies are controlled by two valves, one to an assembly; and a joy stick is moved forwardly and rearwardly for forward and rearward movement of the vehicle and to the right and to the left for turning of the vehicle; the combination with the valves and the joy stick, of a. a direction unit having two restricted orifices of appreciable length, each orifice having one end connected to a source of fluid under pressure and the other end connected to drain, said unit further having two take-off openings, one communicating with one orifice, the other with the other orifice, said unit comprising cooperating relatively movable parts forming the two orifices between them, relative movement of the parts in one direction shifting one take-off opening along the associated orifice in a direction toward the end connected to drain and the other take-off opening along the associated orifice in a direction toward the end connected to the source of pressure fluid and relative movement in the opposite direction reversing the shift of the take-off openings with respect to the source of pressure fluid and drain;

b. means connecting the joy stick with the direction unit to enable forward and rearward movement of the joy stick to produce relative movement of one of the parts of said unit in said one direction and said other direction, respectively;

c. a steering unit having four restricted orifices of appreciable length, four take-off openings, and two supply openings and comprising cooperating relatively angularly movable inner and outer parts, the orifices of the steering unit being formed between an inner surface of the outer part and four peripherally spaced arcuate segments of the outer surface of the inner part closely spaced from the inner surface of the outer part, the said four arcuate segments being spaced from one another by four other segments of the outer surface of the inner member appreciably spaced from said inner surface, two of the said four other segments being at opposite sides of the inner member and being connected by a first opening extending through the inner member, the remaining two of the said four other segments being at opposite sides of the inner member and being connected by a second opening in the inner member having no connection with the first opening, the take-off openings being formed in the outer member and being peripherally spaced from one another, the first and second of the take-off openings being spaced from one another an amount about equal to the width of one arcuate segment of the exterior surface of the inner member, the third and fourth take-off openings being spaced from one another an amount about equal to the width of another of the arcuate segments adjacent said one arcuate segment, the third take-off opening being spaced from the second take-off opening in a direction away from the first take-off opening and in an amount about equal to the width of the one of said four other segments of the outer surface lying between said one and said other arcuate segments, the fourth take-off opening being spaced from the third take-off opening in the same direction as the third is spaced from the second, the supply openings being formed in the outer member, one being connected with one take-off opening in the direction unit and being located in generally opposed diametral relation to a region midway between the second and third take-off openings, the other supply opening being connected with the other take-off opening in the direction unit and being spaced about 90° from one supply opening;

d. means connecting the joy stick with the steering unit to enable corresponding rightward and corresponding leftward movement of the joy stick and steering unit.

6. The combination specified in claim 5, the parts of the steering unit being relatively angularly movable about an axis of rotation and extending for an appreciable distance along the axis of rotation, the orifices of the steering unit being formed between the inner surface of the outer part and four grooves formed in the four arcuate segments of the outer surface on the inner part, one groove to an arcuate segment, each groove having its ends at the sides of the associated arcuate segments and extending for an appreciable distance generally parallel to the axis of rotation and to a slight extent about the axis of rotation, the four take-off openings of the steering unit being formed in the inner surface of the outer part and extending parallel to the axis of rotation.

7. In an apparatus in which two drive mechanisms are controlled by two hydraulic actuators; the combination with the actuators, of a hydraulic unit comprising two cooperating relatively movable parts, two restricted orifices of appreciable length being formed between facing regions of the parts, the unit having two supply openings, the unit further having first, second, third, and fourth take-off openings all formed in the same part, the first and third take-off openings being connected with one hydraulic actuator, the second and fourth take-off openings being connected with the other hydraulic actuator, a central position of one part with respect to the other causing the first and fourth take-off openings and the second and third take-off openings to be connected with the said one supply opening and the said other supply opening, respectively, independently of the orifices, the first and second take-off openings to be connected with one another by way of the entire length of the one orifice, and the third and fourth take-off openings to be connected with one another by way of the entire length of the other orifice, displacement of said one part from its central position in one direction with respect to said other part causing the first take-off opening and the third take-off opening to remain connected with the said one supply opening and said other supply opening, respectively, independently of the orifices, and the fourth take-off opening and the second take-off opening to be connected with the said one supply opening and the said other supply opening, respectively, by way of portions of the lengths of the said other orifice and the said one orifice, respectively, displacement of said one part from its central position in the opposite direction with respect to said other part causing the fourth take-off opening and the second take-off opening to remain connected with the said one supply opening and said other supply opening, respectively, independently of the orifices, and the first take-off opening and the third take-off opening to be connected with the said one supply opening and the said other supply opening, respectively, by way of portions of the lengths of the said one orifice and the said other orifice, respectively.

8. The combination as specified in claim 7, the hydraulic unit being formed of inner and outer parts having facing inner and outer surfaces and being angularly movable with respect to one another about an axis of rotation, the restricted orifices being formed between the facing surface of one of said inner and outer parts and two relatively long grooves formed in the facing surface of the other of said parts and extending for an appreciable distance generally parallel to the axis of rotation and to a slight extent about the axis of rotation, the take-off openings of the hydraulic unit being formed in the facing surface of the said one part and extending parallel to said axis of rotation for an appreciable distance.

9. The combination as specified in claim 8, the grooves forming part of the restricted orifices of the hydraulic unit being on the outer surface of the inner part, the take-off openings being formed in the inner surface of the outer part.

10. In an apparatus in which two drive mechanisms are controlled by two piston-and-cylinder assemblies and said assemblies are controlled by two valves; the combination with the valves, of a unit having four restricted orifices of appreciable length, four take-off openings, and two supply openings and comprising cooperating relatively angularly movable inner and outer parts, the orifices being formed between an inner surface of the outer part and four peripherally spaced arcuate segments of the outer surface of the inner part closely spaced from the inner surface of the outer part, the said four arcuate segments being spaced from one another by four other segments of the outer surface of the inner member appreciably spaced from said inner surface, two of the said four other segments being at opposite sides of the inner member and being connected by a first opening extending through the inner member, the remaining two of the said four other segments being at opposite sides of the inner member and being connected by a second opening in the inner member having no connection with the first opening, the take-off openings being formed in the outer member and being peripherally spaced from one another, the first and second of the take-off openings being spaced from one another an amount about equal to the width of one arcuate segment of the exterior surface of the inner member, the third and fourth take-off openings being spaced from one another an amount about equal to the width of another of the arcuate segments adjacent said one arcuate segment, the third take-off opening being spaced from the second take-off opening in a direction away from the first take-of opening and in an amount equal to the width of the one of said four other segments of the outer surface lying between said one and said other arcuate segments, the fourth take-off opening being spaced from the third take-off opening in the same direction as the third is spaced from the second;

the first and third take-off openings being connected with one valve, the second and fourth take-off openings being connected with the other valve, the supply openings being formed in the outer member.

11. The combination specified in claim 10, the parts of the unit being relatively angularly movable about an axis of rotation and extending for an appreciable distance along the axis of rotation, the orifices of the unit being formed between the inner surface of the outer part and four grooves formed in the four arcuate segments of the outer surface of the inner part, one groove to an arcuate segment, each groove having its ends at the sides of the associated arcuate segments and extending for an appreciable distance generally parallel to the axis of rotation and to a slight extent about the axis of rotation, the four take-off openings of the unit being formed in the inner surface of the outer part and extending parallel to the axis of rotation.

12. In a vehicle in which two drive mechanisms are driven at the same speed in a given direction for straight forward movement of the vehicle, at the same speed in the opposite direction for straight rearward movement of the vehicle, and at speeds in opposite directions or with a proportional differential of speed powered in the same direction for steering of the vehicle, and in which two hydraulic actuators control the direction of drive of the drive mechanisms by the algebraic signs of the differences of the hydraulic pressures applied to the actuators, and proportionally control the speeds of the drive mechanisms by the amounts of such differences, the combination comprising:

the actuators;

a tiltable joy stick (22) and a translatory and rotary bipartite valve (20, 21) operatively related together to afford manual control over an hydraulic pressure differential applied to the actuators;

said bipartite valve having a direction part (20) with slidably related hydraulic differential creating elements, said actuators connected in the output of said elements and responsive to the signs of the differences of the hydraulic pressures applied thereto by said elements;

said bipartite valve having a steering part (21) with rotatably related hydraulic differential creating members, said actuators connected in the output of said members and incrementally proportionally responsive to the amounts of differences of the hydraulic pressures applied thereto by said members;

means (40) supporting the joy stick and bipartite valve in the operative relationship described enabling rightward and leftward tilt of the joy stick to turn the members of the steering part in two directions of rotation; and means (40a, 40b) supporting the joy stick and bipartite valve in the operative relationship described enabling forward and rearward tilt of the joy stick to slide the elements of the direction part in two directions of translation.

* * * * *